May 19, 1931. A. H. BOILEAU 1,805,464

POWER CHURN

Filed Feb. 26, 1930

Inventor
Arthur H. Boileau,
By Wm. O. Belt atty.

Patented May 19, 1931

1,805,464

UNITED STATES PATENT OFFICE

ARTHUR H. BOILEAU, OF CEDAR RAPIDS, IOWA, ASSIGNOR TO CHERRY-BURRELL CORPORATION, OF CEDAR RAPIDS, IOWA, A CORPORATION OF DELAWARE

POWER CHURN

Original application filed June 4, 1928, Serial No. 282,750. Divided and this application filed February 26, 1930. Serial No. 431,387.

This is a division of my application Serial No. 282,750 filed June 4, 1928, for improvements in power churns.

The invention relates to a novel connection between the driving mechanism and the rolls and drum of a power churn.

Among the generic objects of the invention is to provide a connection between the driving mechanism and the rolls and drum of a power churn that will prevent ingress of foreign material into the drum and consequent contamination of the contents of said drum, and to prevent egress of said contents into said connection thus eliminating collection of said contents in said connection and a resulting unsanitary condition.

Another object is to provide a connection which will not be distorted by swelling or other detrimental movements of the drum.

In the accompanying drawings, a selected embodiment of the invention is illustrated and, therein, Fig. 1 is a view partly in elevation and partly in section depicting my improved connection;

Figure 1:
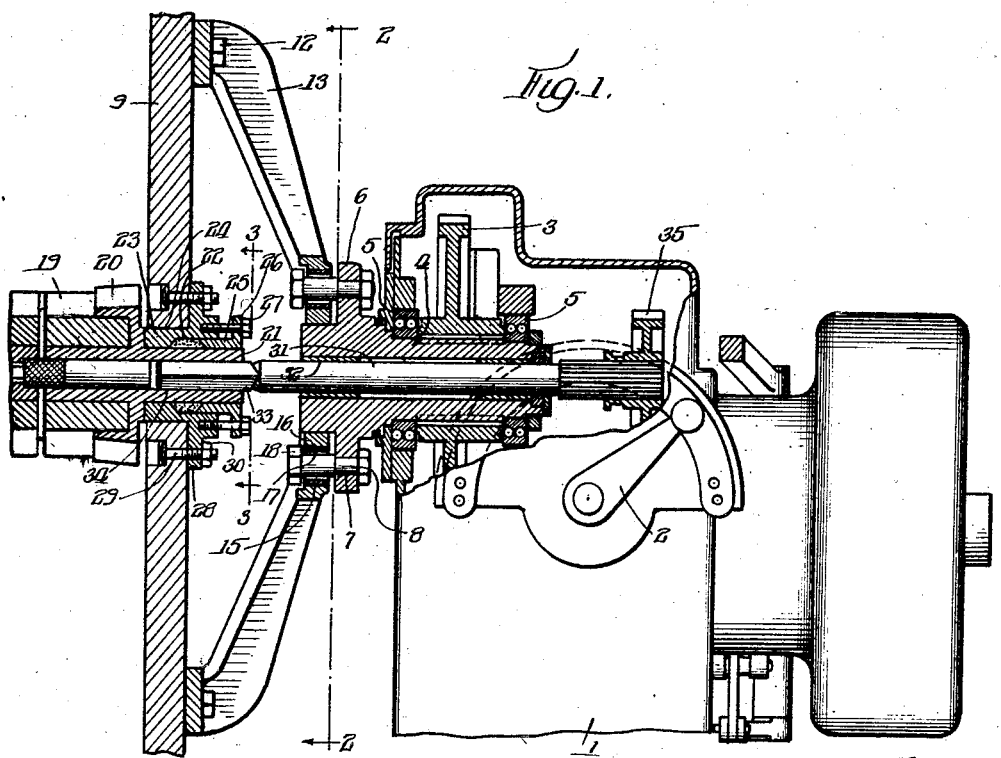
Figure 2:
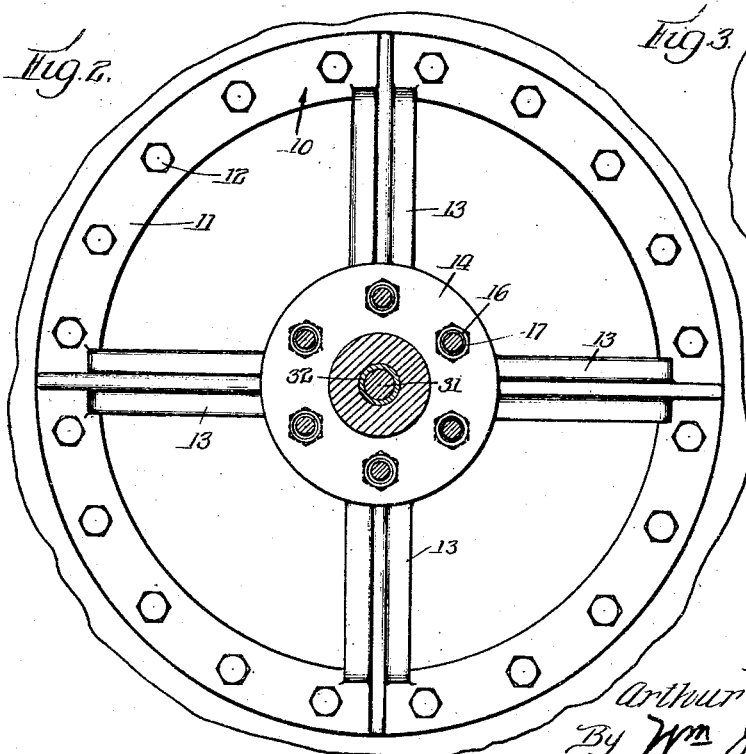
Fig. 2 is a sectional view taken substantially on the line 2—2 on Fig. 1.
Figure 3:
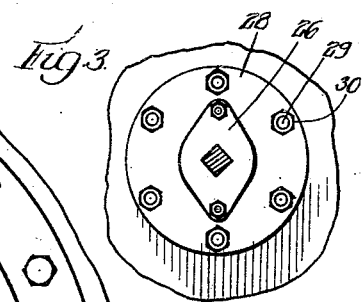
Fig. 3 is a sectional view taken substantially on the line 3—3 on Fig. 1.

Referring to the drawings, 1 indicates a casing in which a suitable driving mechanism for the churn is mounted, which driving mechanism includes a regulating handle 2 movable into different positions to regulate the operation of the churn. The driving mechanism also includes a ring gear 3 mounted on the hollow shaft 4 journaled in bearings 5, 5 supported in the casing 1. A flange 6 on the hollow shaft 4, extraneous the casing 1, has circumferentially spaced openings 7 therein through which bolts 8 are extended. To the end wall 9 of the drum of the churn a spider 10 is secured which includes an annulus 11 through which bolts or the like 12 are extended to connect the annulus to the wall 9. The arms 13 of the spider support a circular portion 14 having openings 15 therein in which bushings 16 are mounted. The bushings 16 have openings 17 therein of greater diameter than the diameter of the bolts 8, said bolts being engaged by the nuts 18. By reason of the difference in diameter of the openings 17 and the bolts 8 a semi-flexible connection is provided between the spider and the flange on the shaft 4 and thus any distortion of the drum due swelling will have no affect upon the driving mechanism. A roll 19 in the drum is rigidly mounted in the roll box 20 mounted adjacent to the wall 9. The roll box 20 includes a sleeve 21 extended through the packing gland 22 including the packing gland collar 23 mounted in the opening 24 in the wall 9 and the packing gland sleeve 25. The packing gland sleeve 25 has a flange 26 thereon and bolts 27 are extended through openings in this flange and are screw-threaded into openings in the end of the packing gland collar 23. The packing gland collar 23 includes a flange 28 connected to the wall 9 by the bolts 29 and the nuts 30. The roll shaft 31 is journaled in bushings 32 in the hollow shaft 4 and has a square end 33 fitted into a similarly shaped socket 34 in the sleeve 21. A gear 35 is mounted on the shaft 31 and is optionally connected to the drive mechanisms in the casing 1. The manner in which the gear 35 is operated is clearly set forth in the heretofore referred to application.

It is manifest from the foregoing description that I have provided a connection between the driving mechanisms and the drum and roll of a power churn which will very effectively accomplish the objects of the invention.

While I have set forth a preferred form of construction for my invention, this is capable of variation and modification without departing from the purview of the following claims:

I claim:

1. In a churn, a roll in said churn, a packing gland secured to the end of the churn and outside thereof, a roll box arranged inside of said churn and extending through said packing gland, said roll box having a square opening therein, and a shaft having a square end adapted to engage said opening for forming a driving connection between the roll and shaft.

2. In a churn, a gear shaft, a flange on said gear shaft, a spider, and means extending through clearance holes in said spider for connecting said spider to said flange in a semi-flexible manner.

3. In a churn, a gear shaft, a flange on said gear shaft, a spider, and means extended through clearance holes in said spider and close fitting holes in said flange for connecting said spider to said flange in a semi-flexible manner.

4. In a churn, a gear shaft, a flange on said gear shaft, a spider having clearance openings therein, bolts extended through said clearance openings and openings in said flange for connecting said spider to said flange, and means for connecting said spider to said drum.

5. In a churn, a roll in said churn, a packing gland at one end of said churn extending outside thereof, a roll box inside said churn having a portion extended through said packing gland, said portion having a socket therein in which the polygonal end of a shaft of a driving mechanism may be fitted.

6. In a churn, a drum, a driving mechanism including a hollow shaft, a roll operating shaft in said hollow shaft, a packing gland on one of the heads of said drum, a roll box extended through said packing gland, means connecting the roll of the churn to said roll box, means connecting the roll operating shaft to the roll box, and means connecting the hollow shaft to the head of the drum whereby said drum may be rotated by rotation of said hollow shaft and said roll may be rotated by rotation of said roll shaft.

7. In a churn, a driving mechanism including a roll operating shaft journaled therein, said churn including a drum embodying a head having an opening therein, means tightly mounted in said opening providing a packing gland, a roll box in said drum having a portion extending through said packing gland and having one end of the roll of the churn tightly connected thereto to prevent leakage thereby, means connecting said hollow shaft to the head of the drum, and means connecting the roll operating shaft to said roll box extraneously of the connection of said roll to said roll box.

ARTHUR H. BOILEAU.